United States Patent
Choi et al.

(10) Patent No.: US 12,166,238 B2
(45) Date of Patent: Dec. 10, 2024

(54) RECHARGEABLE SECONDARY BATTERY

(71) Applicant: Samsung SDI Co., Ltd., Yongin-si (KR)

(72) Inventors: Kyu Gil Choi, Yongin-si (KR); Won Wook Cho, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 17/840,986

(22) Filed: Jun. 15, 2022

(65) Prior Publication Data

US 2022/0407185 A1  Dec. 22, 2022

(30) Foreign Application Priority Data

Jun. 16, 2021 (KR) .......................... 10-2021-0077994

(51) Int. Cl.
| | | |
|---|---|---|
| *H01M 50/466* | (2021.01) | |
| *H01M 10/0583* | (2010.01) | |
| *H01M 50/105* | (2021.01) | |

(52) U.S. Cl.
CPC ..... *H01M 50/466* (2021.01); *H01M 10/0583* (2013.01); *H01M 50/105* (2021.01)

(58) Field of Classification Search
CPC ............ H01M 50/466; H01M 50/105; H01M 10/0583
See application file for complete search history.

(56) References Cited

U.S. PATENT DOCUMENTS

| | | | |
|---|---|---|---|
| 7,781,093 B2 | 8/2010 | Jeung et al. | |
| 8,815,434 B2* | 8/2014 | Ahn .................... | H01M 50/466 |
| | | | 429/129 |
| 10,490,795 B2* | 11/2019 | Minagata .......... | H01M 10/0413 |
| 11,552,357 B2 | 1/2023 | Kim et al. | |
| 2007/0154790 A1 | 7/2007 | Jeung et al. | |
| 2012/0064382 A1* | 3/2012 | Ahn .................... | H01M 50/466 |
| | | | 429/94 |
| 2018/0323416 A1* | 11/2018 | Schlund ............. | H01M 50/463 |
| 2019/0319253 A1* | 10/2019 | An ...................... | H01M 50/103 |
| 2021/0234202 A1 | 7/2021 | Kim et al. | |
| 2022/0131217 A1 | 4/2022 | Kim et al. | |

FOREIGN PATENT DOCUMENTS

| | | |
|---|---|---|
| JP | 2015-153690 A | 8/2015 |
| KR | 10-2007-0073169 | 7/2007 |
| KR | 10-2019-0090305 | 8/2019 |
| KR | 10-2020-0058173 A | 5/2020 |

\* cited by examiner

*Primary Examiner* — Milton I Cano
*Assistant Examiner* — Albert Michael Hilton
(74) *Attorney, Agent, or Firm* — Lewis Roca Rothgerber Christie LLP

(57) ABSTRACT

A secondary battery includes a Z stack electrode assembly including a separator bent in a Z shape and including a plurality of bent areas, a first electrode plate on a lower portion of each of the bent areas, and a second electrode plate on an upper portion of each of the bent areas, and an exterior portion configured to accommodate the Z stack electrode assembly, and an outermost end area of the separator is bent to be thermally fused to a bent area of the plurality of bent areas of the separator.

11 Claims, 7 Drawing Sheets

RECHARGEABLE SECONDARY BATTERY

CROSS-REFERENCE TO RELATED APPLICATION

This application claims priority to and the benefit of Korean Patent Application No. 10-2021-0077994, filed on Jun. 16, 2021 in the Korean Intellectual Property Office, the entire content of which is herein incorporated by reference.

BACKGROUND

1. Field

Aspects of embodiments of the present disclosure relate to a secondary battery.

2. Description of the Related Art

A secondary battery is a chargeable and dischargeable battery, unlike a primary battery that is not chargeable. Low-capacity secondary batteries are typically used in portable small electronic devices, such as smartphones, feature phones, notebook computers, digital cameras, and camcorders, and large-capacity secondary batteries are widely used for a power source and power storage for driving a motor, such as for hybrid vehicles, electric vehicles, and the like.

Such a secondary battery includes an electrode assembly including a positive electrode and a negative electrode, an exterior portion accommodating the electrode assembly, and an electrode terminal connected to the electrode assembly. The exterior portion may be classified into any of circular, prismatic, and pouch types according to a shape thereof. Among these, the pouch type secondary battery may include an exterior portion that is easily deformable into various shapes and has a small weight.

The above-described information disclosed in the technology that serves as the background of the present disclosure is for improving understanding of the background of the present disclosure and thus may include information that does not constitute the related art.

SUMMARY

According to an aspect of embodiments of the present disclosure, a secondary battery including a Z stack electrode assembly is provided.

According to one or more embodiments, a secondary battery includes: a Z stack electrode assembly including a separator bent in a Z shape and having a plurality of bent areas, a first electrode plate on a lower portion of each of the bent areas, and a second electrode plate on an upper portion of each of the bent areas; and an exterior portion configured to accommodate the Z stack electrode assembly, wherein, in the Z stack electrode assembly, an outermost end area of the separator is bent to be thermally fused to a bent area of the plurality of bent areas of the separator.

In the secondary battery, the outermost end area of the separator in the Z stack electrode assembly may be folded to be fused to the bent area of the separator. As such, the Z stack electrode assembly may be prevented or substantially prevented from being unwound, thereby improving manufacturing processability and safety and protecting side surfaces of the electrode plates.

The outermost end area of the separator may be thermally fused to one bent area or a plurality of bent areas of the separator.

The outermost end area of the separator may have a height greater than or equal to that of the Z stack electrode assembly.

The bent area of the separator may include a heat contraction area. A spaced distance between the heat contraction area and each of ends of the first and second electrode plates may be about 0.01 mm to about 1 mm.

According to an aspect of embodiments of the present disclosure, a secondary battery is provided, in which a remaining portion of the bent area on both sides of the separator in the Z stack electrode assembly is contracted to reduce a width of the Z stack, thereby increasing in battery design capacity and securing safety against an external impact (e.g., dropping).

The heat contraction area may further include an impact absorption part. The impact absorption part may include an adhesive. An adhesive may be further applied to the outermost end area of the separator. The adhesive may have a "∩" shape that covers the outermost end area of the separator, an "I" shape that covers an outer or inner surface of the outermost end area of the separator, or an "L" shape that covers both the outermost end area of the separator and an upper end of the separator. An adhesive may be further applied to an inner surface of the exterior, which is in contact with the separator.

According to another embodiment, in a secondary battery, an impact absorption part or an adhesive is further disposed outside a Z stack electrode assembly to absorb an external impact through the impact absorption part, thereby preventing or substantially preventing the Z stack electrode assembly from moving or being cracked in an exterior portion.

BRIEF DESCRIPTION OF THE DRAWINGS

The accompanying drawings are included to provide a further understanding of the present disclosure, and are incorporated in and constitute a part of this specification. The drawings illustrate some embodiments of the present disclosure and, together with the description, serve to explain principles of the present disclosure. In the drawings.

DETAILED DESCRIPTION

Herein, some example embodiments will be described in further detail with reference to the accompanying drawings.

The present disclosures may, however, be embodied in many different forms and should not be construed as being limited to the embodiments set forth herein; rather, these embodiments are provided so that those skilled in the art may thoroughly understand the present disclosure. Rather, these embodiments are provided so that this disclosure will be thorough and complete, and will fully convey the scope of the present invention to those skilled in the art.

In addition, in the following drawings, the thickness or size of each layer may be exaggerated for convenience and clarity of description, and the same reference numerals in the drawings refer to the same elements. As used herein, the term "and/or" includes any and all combinations of one or more of the associated listed items. In this specification, it is also to be understood that when a member A is referred to as being connected to a member B, the member A may be directly connected to the member B or indirectly connected to the member B with one or more members C therebetween.

The terms used herein are for illustrative purposes of the present invention only and should not be construed to limit the meaning or the scope of the present invention. As used in this specification, a singular form may, unless definitely indicating a particular case in terms of the context, include a plural form. Also, the expressions "comprise/include" and/or "comprising/including" used in this specification neither define the mentioned shapes, numbers, steps, operations, members, elements, and/or groups of these, nor exclude the presence or addition of one or more other different shapes, numbers, steps, operations, members, elements, and/or groups of these, or addition of these. The term "and/or" used herein includes any and all combinations of one or more of the associated listed items.

As used herein, terms such as "first," "second," etc. are used to describe various members, components, areas, layers, and/or portions. However, it is to be understood that the members, components, areas, layers, and/or portions should not be defined by these terms. The terms do not mean a particular order, up and down, or superiority, and are used for distinguishing one member, component, area, layer, or portion from another member, component, area, layer, or portion. Thus, a first member, component, area, layer, or portion which will be described may also refer to a second member, component, area, layer, or portion, without departing from the teaching of the present invention.

Spatially relative terms, such as "below," "beneath," "lower," "above," "upper," and the like, may be used herein for ease of description to describe one element or feature's relationship to another element(s) or feature(s) as illustrated in the figures. These spatially relative terms are intended for ease of comprehension of the present invention according to various process states or usage states of the prevent invention, and, thus, the present invention is not limited thereto. For example, if an element or feature shown in the drawings is turned over, the element or feature described as "beneath" or "below" may change into "above" or "upper." Thus, the term "lower" may encompass the term "upper" or "below."

Unless otherwise defined, all terms (including technical and scientific terms) used herein have the same meaning as commonly understood by one of ordinary skill in the art to which the inventive concept pertains. It is also to be understood that terms defined in commonly used dictionaries should be interpreted as having meanings consistent with the meanings in the context of the related art, and are expressly defined herein unless they are interpreted in an ideal or overly formal sense.

In addition, the term "separator" as used herein may include a separator generally used in a liquid electrolyte battery using a liquid electrolyte having low affinity with the separator. Further, a "separator" as used herein may include an intrinsic solid polymer electrolyte, a gel solid polymer electrolyte, and/or a solid inorganic electrolyte in which the electrolyte is strongly restricted to the separator, and the electrolyte and the separator are recognized as the same.

Figure 1A:
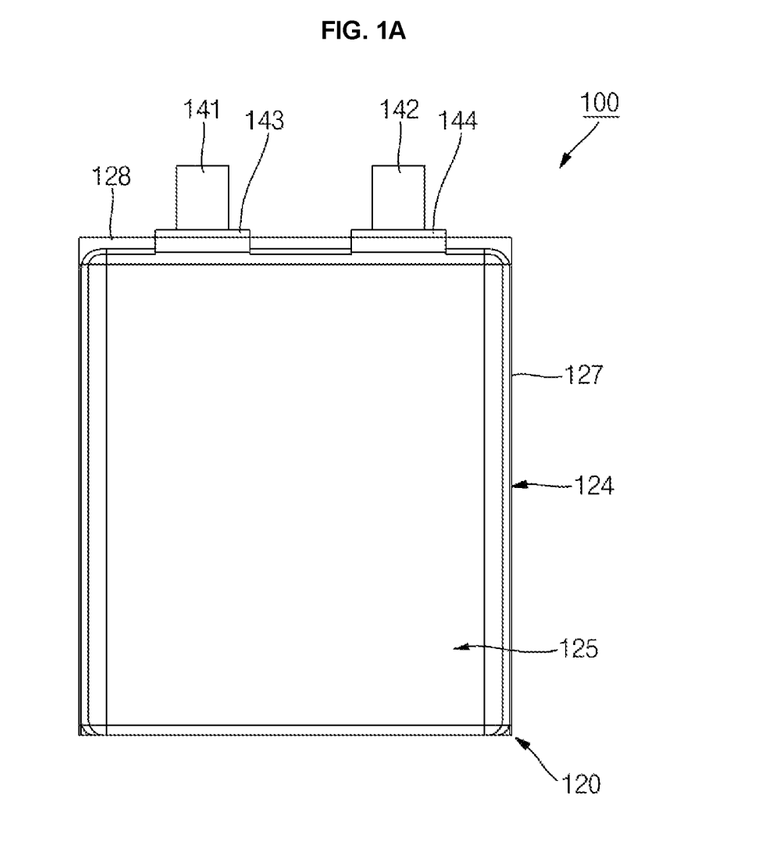
FIGS. 1A and 1B are plan and perspective views, respectively, illustrating a secondary battery and a Z stack electrode assembly according to an embodiment.
Figure 1B:
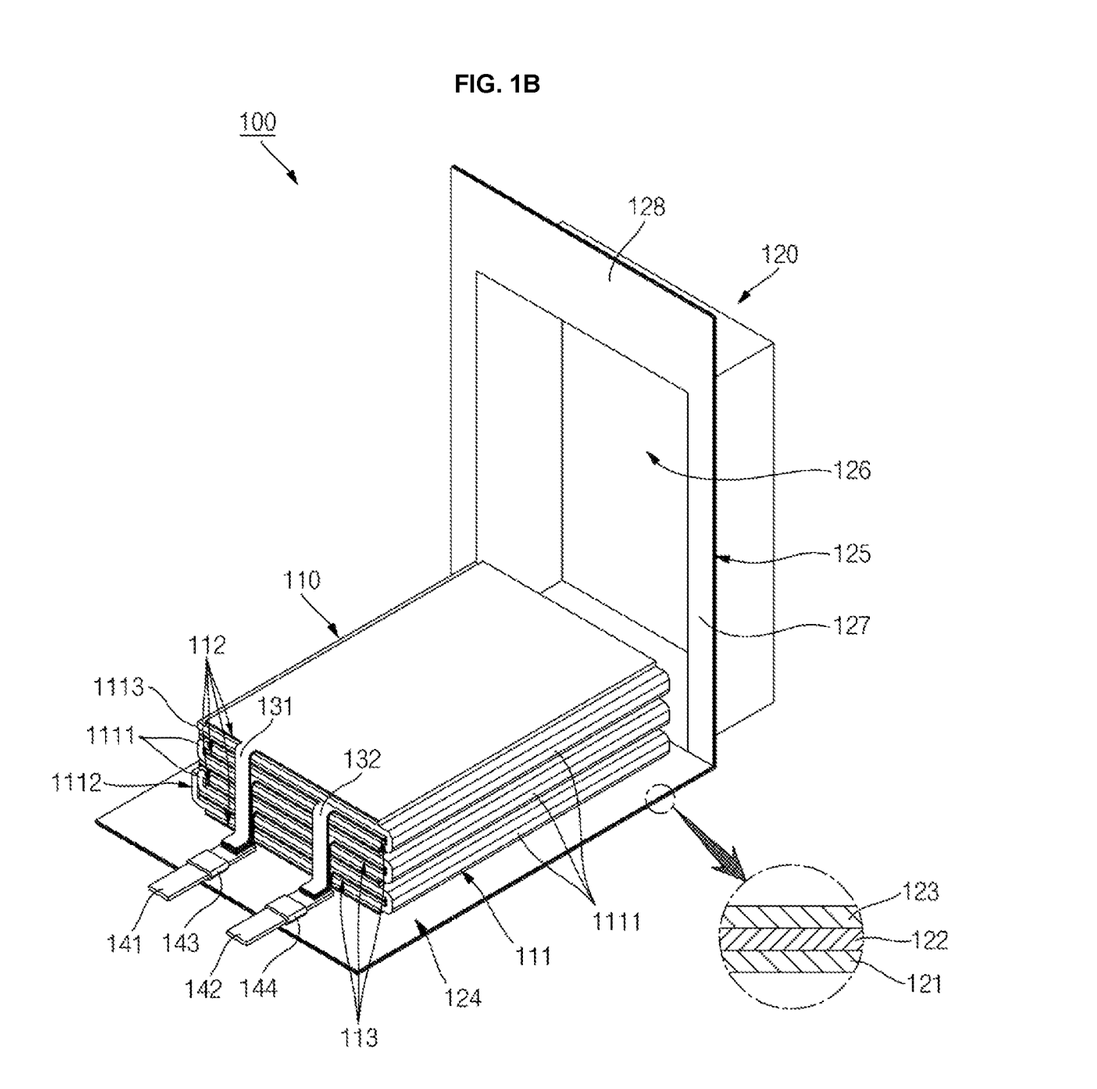

FIGS. 1A and 1B are plan views illustrating a secondary battery 100 and a Z stack electrode assembly 110 according to an embodiment.

In an example embodiment illustrated in FIGS. 1A and 1B, the secondary battery 100 may include the Z stack electrode assembly 110, an exterior, or exterior portion, 120, a first cell tab 141, and a second cell tab 142.

The Z stack electrode assembly 110 may include, for example, a separator 111 in which a plurality of bent areas are bent in a Z (or S) shape and alternately disposed, a first electrode plate 112 disposed on a lower portion of a bent area 1111 of the separator 111, and a second electrode plate 113 disposed on an upper portion of the bent area 1111 of the separator 111. The first electrode plate 112 may be disposed on the lower portion of the separator 111 extending in a horizontal direction, and the second electrode plate 113 may be disposed on the upper portion of the separator 111 extending in the horizontal direction. The bent area 1111 may be provided at an end of the separator 111 disposed between the first and second electrode plates 112 and 113. In this manner, the separator 111 may be bent several times (bent in the Z (or S) shape) to be stacked, and the first electrode plate 112 and the second electrode plate 113, which have polarities opposite to each other, may be disposed on the lower and upper portions of the bent separator 111 to cross each other.

As illustrated in FIG. 1B, the separator 111 may be provided with, for example, three bent areas 1111 at a right side and two bent areas 1111 at a left side, but embodiments of the present disclosure are not limited to a number of bent areas. In addition, the separator 111 may include an outermost end area 1112 provided on a lower portion thereof and an upper end area 1113 provided on an upper portion thereof.

In some examples, the separator 111 may include or be referred to as a separator or a separation film. In some examples, the separator 111 may include any of polyethylene, polypropylene, and a porous copolymer of polyethylene and polypropylene. In some examples, the separator 111 may be coated with ceramic on a surface thereof to improve thermal performance.

In some examples, the separator 111 may have a width greater than that of each of the first electrode plate 112 and the second electrode plate 113 to prevent or substantially prevent an electrical short circuit from occurring between the first electrode plate 112 and the second electrode plate 113.

In some examples, the first electrode plate 112 may include a first active material layer 1122 applied to both surfaces of a first collector plate 1121 provided as a thin conductive metal plate, for example, made of copper or nickel foil or mesh. In some examples, the first active material layer 1122 may include, for example, a carbon-based material, Si, Sn, tin oxide, a tin alloy composite, a transition metal oxide, lithium metal nitride, or a metal oxide. In some examples, the first electrode plate 112 may function as a negative electrode. In some examples, the first collector plate 1121 may further include a first base tab 131 extending outward by a length (e.g., a predetermined length) without forming the first active material layer 1122 and may be welded to the first cell tab 141. In some examples, a separate first lead tab may connect a first non-coating portion to the first cell tab 141 instead of the first base tab 131.

In some examples, the second electrode plate 113 may include a second active material layer 1132 applied to both surfaces of a second collector plate 1131 provided as a thin metal plate having excellent conductivity, for example, made of aluminum foil or mesh. In some examples, the positive electrode active material layer may include, for example, a chalcogenide compound, for example, a composite metal oxide such as $LiCoO_2$, $LiMn_2O_4$, $LiNiO_2$, $LiNiMnO_2$, or the like. In some examples, the second electrode plate 113 may function as a positive electrode. In some examples, the second collector plate 1131 may further include a second base tab 132 extending outward by a length (e.g., a predetermined length) without forming the second active material layer 1132 and may be welded to the second cell tab 142. In some examples, a separate second lead tab may connect a second non-coating portion to the second cell tab 142 instead of the second base tab 132.

The exterior 120 may be provided by accommodating the Z stack electrode assembly 110 and sealing an outer circumference of the Z stack electrode assembly 110. The exterior 120 may include or be referred to as a case, a can, a pouch, or a housing. In some examples, the exterior 120 may be provided in a laminate structure including, for example, a first insulating layer 121, a metal layer 122, and a second insulating layer 123. Of course, in addition to this structure, various adhesive layers or functional layers may be further added, but descriptions thereof will be omitted.

In some examples, the exterior 120 may include a first exterior part 124 and a second exterior part 125 having an end connected to the first exterior part 124 and a recess 126 having a depth (e.g., a predetermined depth) to accommodate the electrode assembly 110. In some examples, circumferences of the first and second exterior parts 124 and 125 corresponding to the outer circumference of the Z stack electrode assembly 110 may be thermally fused to each other, and, thus, the Z stack electrode assembly 110 may be accommodated in the pouch type or pocket type exterior 120.

In some examples, an intermediate portion of the exterior 120 having an integrated rectangular plate shape may be bent in a longitudinal direction of a side to provide the first exterior part 124 and the second exterior part 125. The second exterior part 125 may have the recess 126 in which the electrode assembly 110 is accommodated through a press or drawing process, and a sealing area 127 for sealing with the first exterior 124 may be provided on an outer circumference of the recess 126. In an embodiment, the sealing area 127 may be provided on all of a side at which the first exterior part 124 and the second exterior part 125 are in integrated contact with each other, and other three sides.

In an embodiment, the first base tab 131 of the Z stack electrode assembly 110 may be welded to the first cell tab 141, and the second base tab 132 may be welded to the second cell tab 142. The first cell tab 141 and the second cell tab 142 may extend outward by a length (e.g., a predetermined length) through the exterior 120 with a first sealing tape 143 and a second sealing tape 144 therebetween, respectively. In some examples, an area of the exterior 120 in which the first cell tab 141 and the second cell tab 142 extend outward is also referred to as a terrace 128. In an embodiment, the first cell tab 141 may be made of copper and nickel, and the second cell tab 142 may be made of aluminum.

Figure 2A:
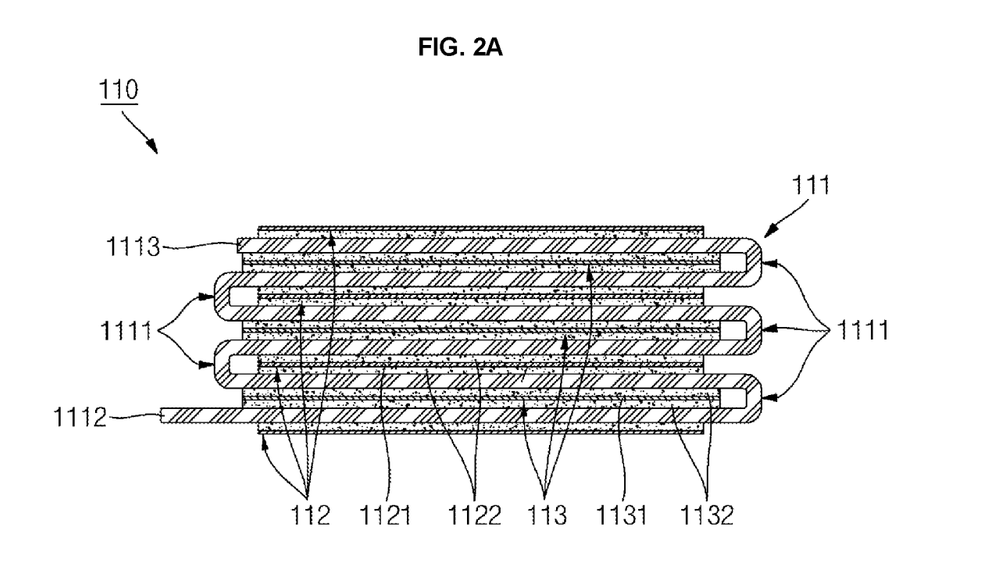
FIGS. 2A and 2B are schematic cross-sectional views illustrating a thermo-compression method of the Z stack electrode assembly in a secondary battery according to an embodiment.
Figure 2B:
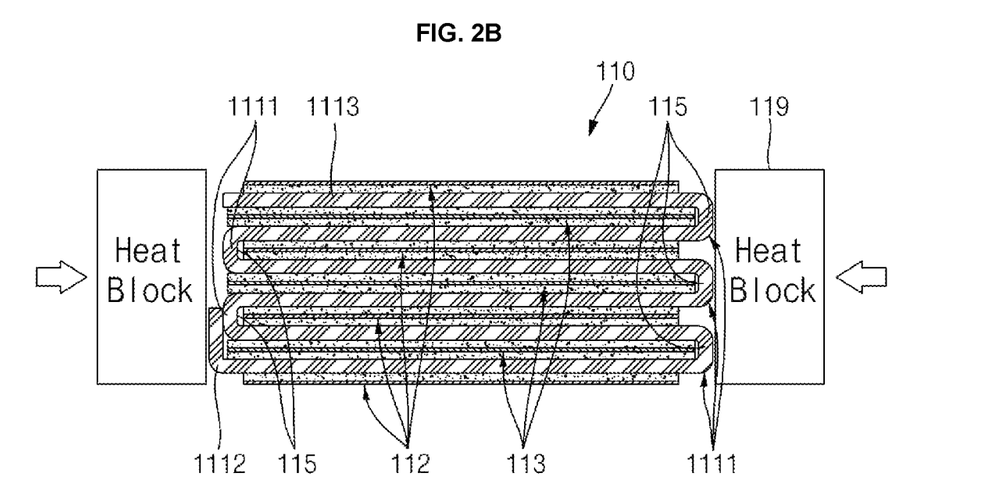

FIGS. 2A and 2B are schematic view illustrating a thermo-compression method of the Z stack electrode assembly 110 in the secondary battery 100 according to an embodiment. The Z stack electrode assembly 110 illustrated in FIG. 2A is in an initial manufacturing state, and the Z stack electrode assembly 110 illustrated in FIG. 2B is in a later manufacturing state.

As illustrated in FIG. 2A, in the initial stage of manufacturing the Z stack electrode assembly 110, for reason of the manufacturing process, the outermost end area (lower area) of the separator 111 may extend to the outside of the Z stack electrode assembly 110, and a relatively large gap or space may be defined between both ends of the first electrode plate 112 and the second electrode plate 113 and the bent area 1111 of the separator 111.

Thus, when the Z stack electrode assembly 110 is inserted into the exterior 120, a defect in which the outermost end area 1112 of the separator 111 is folded may easily occur, and, also, when compared to the winding type, since the structure of the Z stack electrode assembly 110 is relatively weak, the electrode assembly 110 may be easily unwound when an external impact, such as dropping, occurs. When the electrode assembly 110 is unwound, internal resistance increases, and battery performance is deteriorated. In addition, since the relatively large gap exists between both the ends of the first electrode plate 112 and the second electrode plate 113 and the bent area 1111 of the separator 111, when compared to the winding type electrode assembly, the structure of the Z stack electrode assembly 110 may be relatively weak, it is easy to be unwound when the external impact, such as dropping, occurs, and it is difficult to secure design capacity due to an increase in length in a width direction.

Thus, in the present disclosure, as illustrated in FIG. 2B, a thermal fusion process using a heat block 119 and/or hot air may be performed. In some examples, the outermost end area 1112 of the separator 111 may be bent in an upward direction so as to be thermally fused to the bent area 1111. In some examples, the outermost end area 1112 of the separator 111 may be thermally fused to one bent area 1111 of the separator. In some examples, the bent area 1111 of the separator 111 may include a heat contraction area 115 by the thermal fusion process. In some examples, a spaced distance between the heat contraction area 115 and each of the ends of the first and second electrode plates 112 and 113 may be about 0.01 mm to about 1 mm.

In this manner, in the present disclosure, since the outermost end area 1112 of the separator 111 in the Z stack electrode assembly 110 is folded upward and then thermally fused to the bent area 1111 to prevent or substantially prevent the Z stack from being unwound, the manufacturing processability and safety may be improved, and the secondary battery 100, in which a side surface of the electrode plate is protected, may be provided. In addition, in the present disclosure, the remaining portions of both the bent areas 1111 of the separator 111 in the Z stack electrode assembly 110 may be thermally contracted to reduce a width of the Z stack, thereby increasing a battery design capacity and providing the secondary battery 100, in which the safety is secured from an external impact (for example, dropping).

Figure 3A:
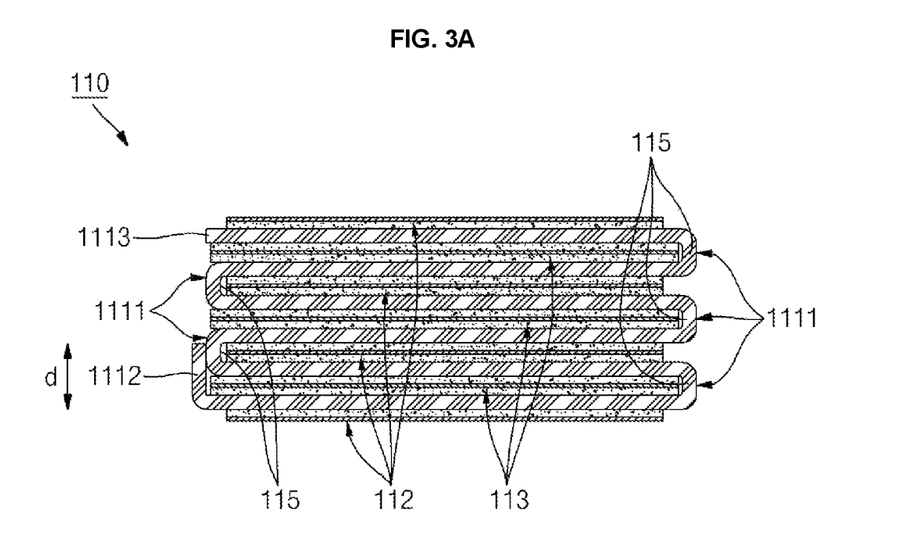
FIGS. 3A and 3B are cross-sectional views illustrating a Z stack electrode assembly in a secondary battery according to an embodiment.
Figure 3B:
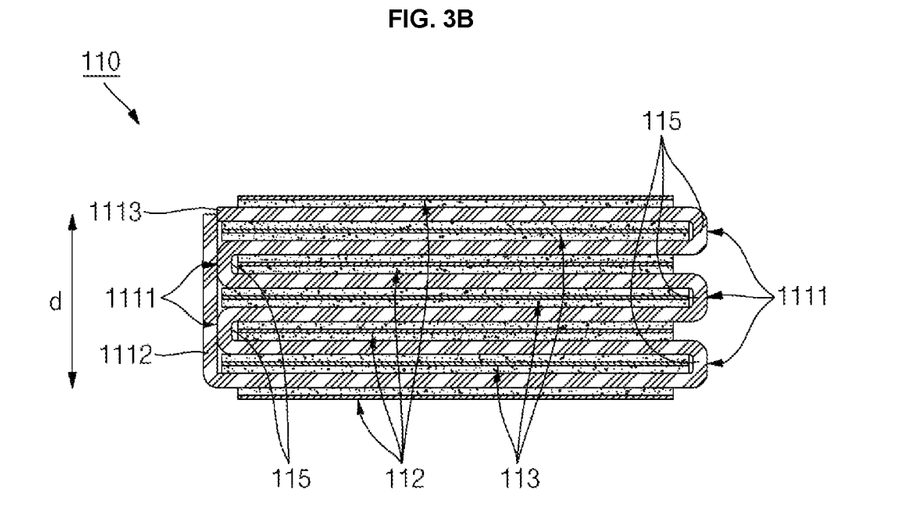

FIGS. 3A and 3B are cross-sectional views illustrating the Z stack electrode assembly 110 in the secondary battery 100 according to an embodiment.

As illustrated in FIG. 3A, in the Z stack electrode assembly 110, the outermost end area 1112 of the separator 111 may have a height d less than that of the Z stack electrode assembly 110. For example, the outermost end area 1112 of the separator 111 may be thermally fused to one bent area 1111.

As illustrated in FIG. 3B, in the Z stack electrode assembly 110, the outermost end area 1112 of the separator 111 may have a height d approximately the same as a height of the Z stack electrode assembly 110. For example, the outermost end area 1112 of the separator may be thermally fused to a plurality of bent areas 1111. As described above, since the outermost end area 1112 of the separator 111 is thermally fused to the plurality of bent areas 1111, an unwinding phenomenon of the Z stack electrode assembly 110 may be further suppressed.

FIGS. 4A to 4D are cross-sectional views illustrating a secondary battery according to an embodiment.

As illustrated in FIGS. 4A to 4D, the Z stack electrode assembly 110 may further include impact absorption parts 116A, 116B, 116C, and 116D. In some examples, each of the impact absorption parts 116A, 116B, 116C, 116D may include an adhesive. In some examples, the adhesive may include an adhesive tape, a double-sided adhesive tape, a single-sided adhesive tape, or an oriented polystyrene (OPS) tape.

Figure 4A:
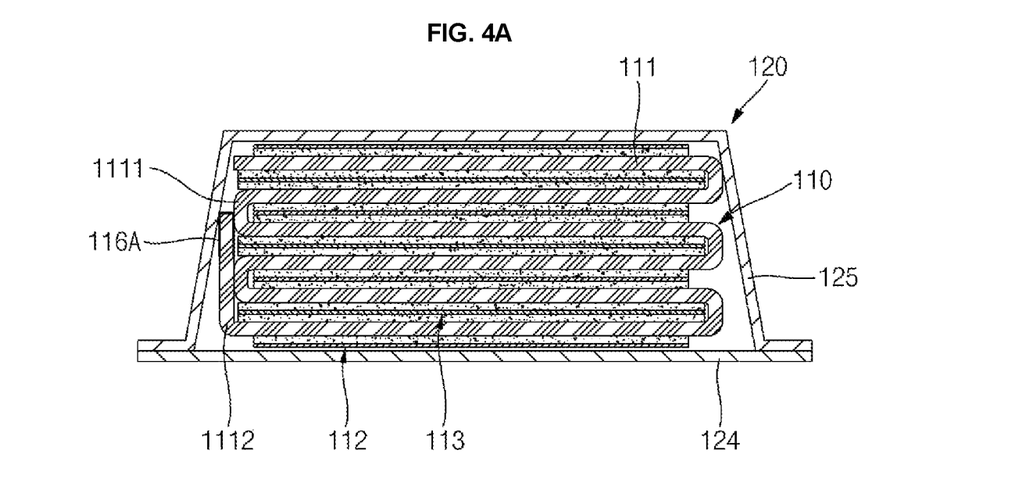
FIGS. 4A to 4D are cross-sectional views illustrating a secondary battery according to an embodiment.

As illustrated in FIG. 4A, the impact absorption part or the adhesive 116A may be provided in the shape of approximately "∩" so as to cover the outermost end area 1112 of the separator 111. In this manner, the impact absorption part 116A may be in contact with an inner surface of the exterior 120, the separator 111, and the electrode plate to prevent or substantially prevent the Z stack electrode assembly 110 from being unwound by an external impact.

Figure 4B:
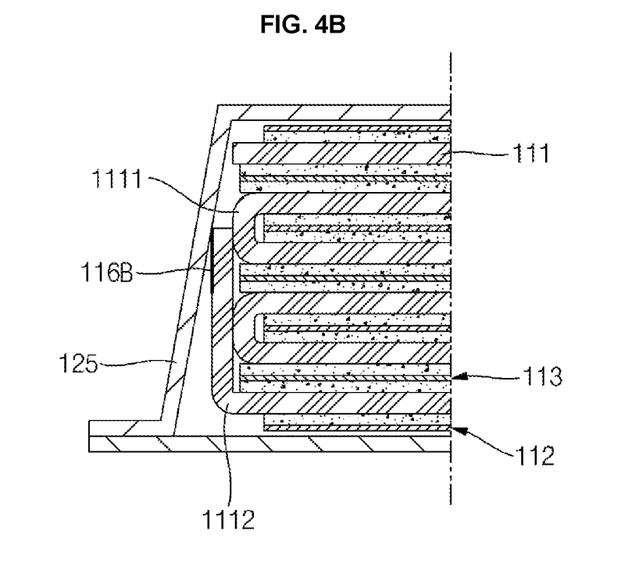

As illustrated in FIG. 4B, the impact absorption part or the adhesive 116B may be provided in the shape of approximately "I" that covers an outer surface of the outermost end area 1112 of the separator 111. In this manner, the impact absorption part 116B may be in contact with the exterior 120 to prevent or substantially prevent the Z stack electrode assembly 110 from being unwound by an external impact.

Figure 4C:
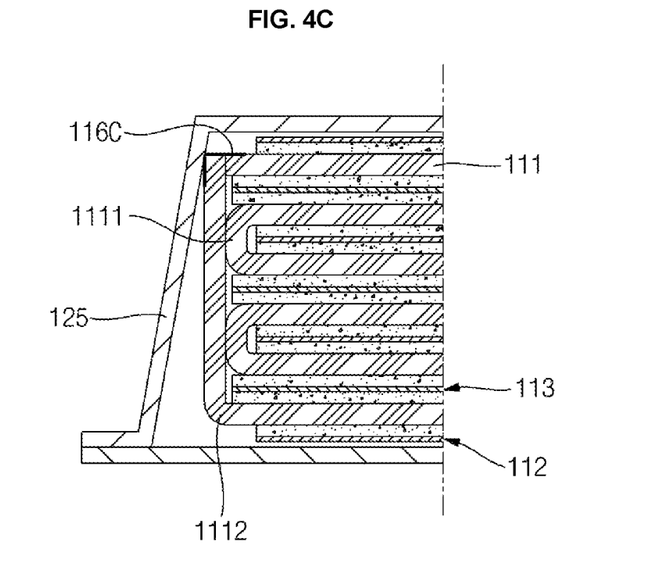

As illustrated in FIG. 4C, the impact absorption part or the adhesive 116C may be provided in the shape of an approximately "L" to cover the outermost end area 1112 of the separator 111 and an upper end of the separator 111. In this manner, the impact absorption part 116C may be in contact with the exterior 120 to prevent or substantially prevent the Z stack electrode assembly 110 from being unwound by an external impact.

Figure 4D:
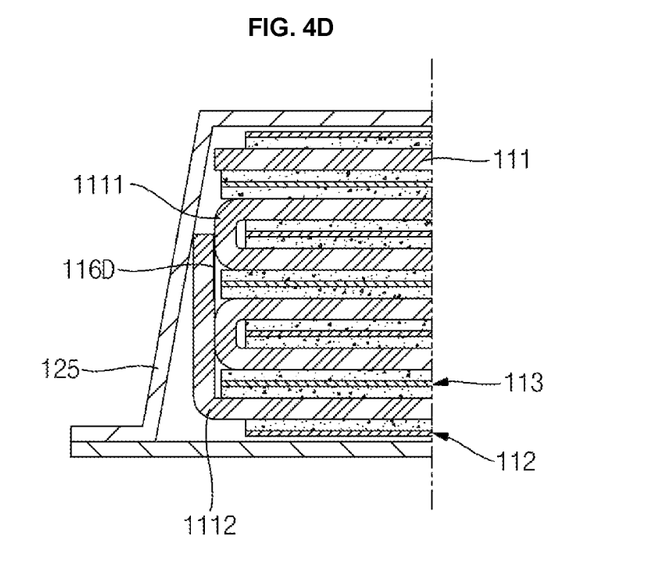

As illustrated in FIG. 4D, the impact absorption part or the adhesive 116D may be provided in the shape of approximately "I" that covers an inner surface of the outermost end area 1112 of the separator 111. In this manner, the impact absorption part 116D may be in contact with the bent area 1111 of the separator 111 to prevent or substantially prevent the Z stack electrode assembly 110 from being unwound by an external impact.

In some examples, when the impact absorption part or adhesive 116A, 116B, 116C, or 116D is in contact with an inner surface of the exterior 120, the impact absorption part or adhesive 116A, 1166, 116C, or 116D may be previously applied to the inner surface of the exterior 120.

Figure 5:
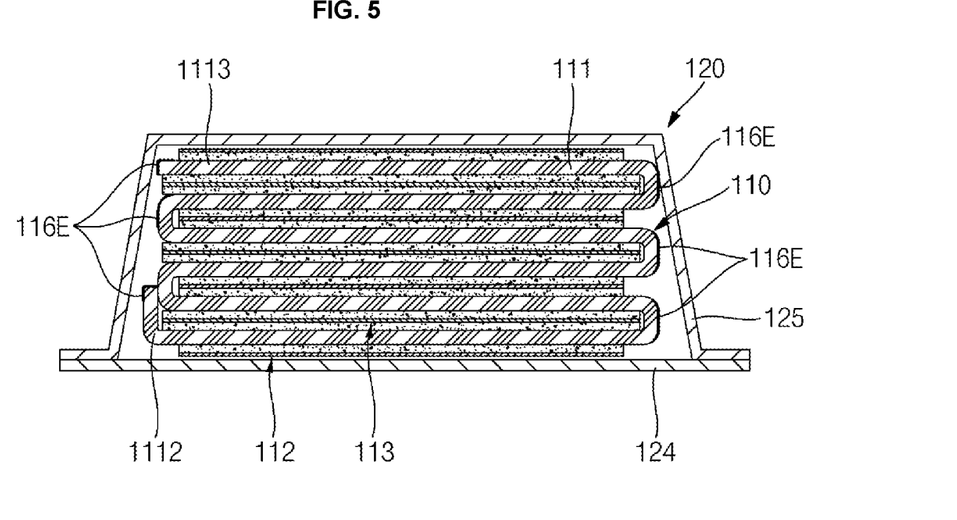
FIG. 5 is a cross-sectional view illustrating a secondary battery according to an embodiment.

FIG. 5 is a cross-sectional view illustrating a secondary battery according to an embodiment.

As illustrated in FIG. 5, in the Z stack electrode assembly 110, an impact absorption part 116E may be provided on each of the outermost end area 1112 of the separator 111, the plurality of bent areas 1111, and the upper end area 1113 of the separator 111. A portion of the impact absorption parts 116E may be in contact with the inner surface of the exterior 120 to protect the Z stack electrode assembly 110 from an external impact.

Embodiments of the present disclosure may provide the secondary battery, in which the outermost end area of the separator in the Z stack electrode assembly is folded to be fused to the bent area of the separator so as to prevent or substantially prevent the Z stack from being unwound, thereby improving manufacturing processability and safety and protecting both of the side surfaces of the electrode plate.

Embodiments of the present disclosure may provide the secondary battery, in which the remaining portion of the bent area on both the side surfaces of the separator in the Z stack electrode assembly is contracted to reduce the width of the Z stack, thereby increasing battery capacity and securing safety against an external impact (e.g., dropping).

The above-described embodiments are merely provided as example embodiments of the secondary battery, and, thus, the present disclosure is not limited to the foregoing embodiments, and, also, it will be understood by those of ordinary skill in the art that various changes in form and details may be made therein without departing from the spirit and scope of the present disclosure as set forth by the following claims.

What is claimed is:

1. A secondary battery comprising:
a Z stack electrode assembly comprising a separator bent in a Z shape and comprising a plurality of bent areas, a first electrode plate on a lower portion of each of the bent areas, and a second electrode plate on an upper portion of each of the bent areas; and
an exterior portion configured to accommodate the Z stack electrode assembly,
wherein, in the Z stack electrode assembly, an outermost end area of the separator is bent to be thermally fused to a bent area of the plurality of bent areas of the separator, and the first electrode plate located outside the separator at a top of the Z stack electrode assembly and the first electrode plate located outside the separator at a bottom of the Z stack electrode assembly are not surrounded by the outermost end area of the separator and are exposed to the outside.

2. The secondary battery of claim 1, wherein the outermost end area of the separator is thermally fused to the bent area of the separator.

3. The secondary battery of claim 1, wherein the outermost end area of the separator is thermally fused to the plurality of bent areas of the separator.

4. The secondary battery of claim 1, wherein the outermost end area of the separator has a height greater than or equal to that of the Z stack electrode assembly.

5. The secondary battery of claim 1, wherein the bent area of the separator comprises a heat contraction area.

6. The secondary battery of claim 5, wherein a spaced distance between the heat contraction area and each of ends of the first and second electrode plates is about 0.01 mm to about 1 mm.

7. The secondary battery of claim 5, wherein the heat contraction area further comprises an impact absorption part.

8. The secondary battery of claim 7, wherein the impact absorption part comprises an adhesive.

9. The secondary battery of claim 1, further comprising an adhesive applied to the outermost end area of the separator.

10. The secondary battery of claim 9, wherein the adhesive has a ∩ shape that covers the outermost end area of the separator, an I shape that covers an outer or inner surface of the outermost end area of the separator, or an L shape that covers both the outermost end area of the separator and an upper end of the separator.

11. The secondary battery of claim 1, further comprising an adhesive applied to an inner surface of the exterior portion, which is in contact with the separator.

* * * * *